(12) United States Patent
Tünnermann et al.

(10) Patent No.: US 8,625,644 B2
(45) Date of Patent: Jan. 7, 2014

(54) STABILISATION OF THE REPETITION RATE OF A PASSIVELY Q-SWITCHED LASER BY MEANS OF COUPLED RESONATORS

(75) Inventors: Andreas Tünnermann, Weimar (DE); Dirk Nodop, Jena (DE); Alexander Steinmetz, Jena (DE); Jens Limpert, Jena (DE)

(73) Assignees: Fraunhofer-Gesellschaft zur Forderung der Angewandten Forschung E.V., Munich (DE); Friedrich-Schiller-Universitat Jena, Jena (DE)

( * ) Notice: Subject to any disclaimer, the term of this patent is extended or adjusted under 35 U.S.C. 154(b) by 0 days.

(21) Appl. No.: 13/497,412

(22) PCT Filed: Sep. 17, 2010

(86) PCT No.: PCT/EP2010/005710
§ 371 (c)(1),
(2), (4) Date: Jun. 12, 2012

(87) PCT Pub. No.: WO2011/032711
PCT Pub. Date: Mar. 24, 2011

(65) Prior Publication Data
US 2012/0242973 A1    Sep. 27, 2012

(30) Foreign Application Priority Data
Sep. 21, 2009   (DE) .................. 10 2009 042 003

(51) Int. Cl.
*H01S 3/113*    (2006.01)

(52) U.S. Cl.
USPC ............................... 372/11; 372/10; 372/102

(58) Field of Classification Search
USPC ............................................. 372/10–16, 102
See application file for complete search history.

(56) References Cited

U.S. PATENT DOCUMENTS

| | | | | |
|---|---|---|---|---|
| 6,807,198 | B1 * | 10/2004 | Furbach et al. | 372/18 |
| 2003/0063855 | A1 * | 4/2003 | Spaelter | 385/37 |
| 2005/0254533 | A1 * | 11/2005 | Hollemann et al. | 372/25 |
| 2009/0059974 | A1 * | 3/2009 | Wang et al. | 372/22 |

OTHER PUBLICATIONS

Notification of Transmittal of the International Search Report and the Written Opinion of the International Searching Authority, or the Declaration issued on Feb. 3, 2011 by the SE International Searching Authority in International Application No. PCT/EP2010/005710.

(Continued)

*Primary Examiner* — Kinam Park
(74) *Attorney, Agent, or Firm* — Raymond R. Ferrera; Adams and Reese LLP

(57) ABSTRACT

The invention relates to a Q-switched laser comprised of a pump light source (1), an optical resonator accommodating a laser medium (6), and a passive Q-switch (5). It is the object of the present invention to provide an improved Q-switched laser which is of a simple and compact setup while having the least possible jitter of the repetition time. To achieve this target, the invention proposes that by means of a beam splitter (8) part of the light coupled out of the optical resonator is passed on to an optical delay line (9) and coupled back into the optical resonator upon having passed through the optical delay line (9).

12 Claims, 3 Drawing Sheets

(56) References Cited

OTHER PUBLICATIONS

Figure 1:
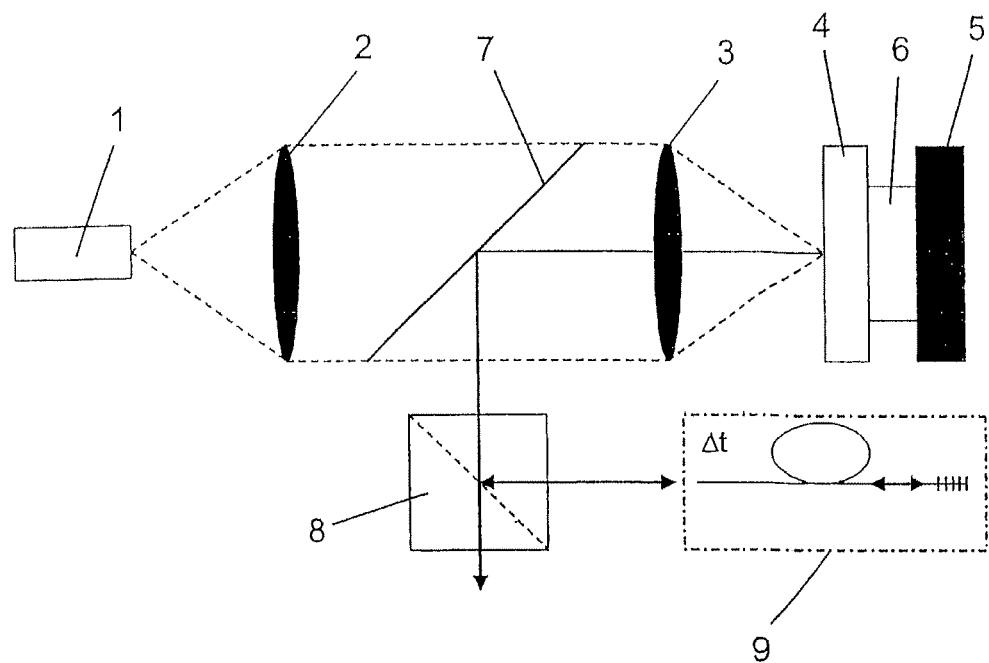
Figure 2:
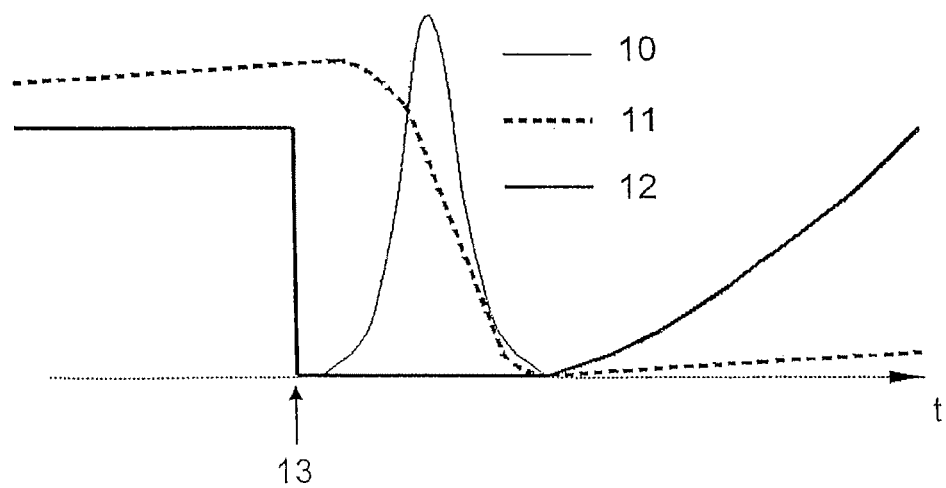

Boczar B P et al: "New Scheme for Ultrashort-Pulsed ND3+YAG Laser Operation: A Branched Cavity, Internally Seeded Regenerative Amplifier", Applied Optics, Optical Society of America, US, vol. 22, No. 11, Jun. 1, 1983, pp. 1611-1613, XP000709227, ISSN:0003-6935,DOI: DOI:10.1364/A0.22.001611 p. 1611, Right-Hand Column-p. 1612, Right-Hand Column; Figures 1, 2.

Kong F et al: "Phase locking of short-pulse Q-switched lasers", Optics Communications, North-Holland Publishing Co. Amsterdam, NL, vol. 282, No. 8, Apr. 15, 2009, pp. 1622-1625, XP025993622, ISSN: 0030-4018, DOI: DOI:10.1016/J.OPTCOM.2008.12.074 [retrieved on Jan. 20, 2009] p. 1623, left-hand column-p. 1625, right-hand column; figures 1,3,5.

Mozdy E J et al: "Self-starting of additive-pulse modelocked laser using novel bonded saturable Bragg reflector", Electronics Letters, IEE Stevenage, GB, vol. 34, No. 15, Jul. 23, 1998, pp. 1497-1498, XP006010076, ISSN: 0013-5194, DOI: DO1:10.1049/EL:1998 1032 p. 1497; figure 1.

\* cited by examiner

STABILISATION OF THE REPETITION RATE OF A PASSIVELY Q-SWITCHED LASER BY MEANS OF COUPLED RESONATORS

This application is the National Stage of International Application No. PCT/EP2010/005710, filed Sep. 17, 2010.

The invention relates to a Q-switched laser comprised of a pump light source, an optical resonator accommodating a laser medium and a passive Q-switch.

Q-switching is a frequently applied technique to generate intensive short light pulses with lasers. Q-switched lasers are versatile in application. In some applications, it is the short pulse duration that stands in the foreground. In other applications, the focus is rather on high pulse energy and peak power, and in still other applications, it is on high pulse repetition rate. Pulses generated by Q-switching typically have a duration of some tens of picoseconds up to some hundreds of nanoseconds. Pulse energy varies between some nanojoules and many millijoules.

The principle of Q-switching is based on storing a certain amount of energy by means of the pump light source in the laser medium during an initial phase and retrieving this energy in a second phase in form of a short pulse. During the first phase, the laser activity is prevented by the Q-switch in the optical resonator. Upon reversal of the Q-switch, these losses are abruptly reduced. The fluorescent light emitted from the laser medium is noticeably intensified on each resonator roundtrip. Amplification is by magnitudes higher than in case of a continuous operation. The optical power in the resonator and the power coupled out of the resonator rises in the course of several resonator roundtrips until the light pulse has depleted a substantial portion of energy from the laser medium stored there. Then the laser power drops sharply and a new cycle can start.

The pump light source of a Q-switched laser can be operated in pulsed mode or even continuously which is frequently the case with diode lasers. With Q-switched lasers, the laser medium must be capable of storing a noticeable amount of energy throughout a certain period of time.

In passive Q-switching, the Q-switch is a saturable absorber. Initially it produces high losses, which however are overcompensated by the laser amplification as soon as sufficient energy is stored in the laser medium. As soon as the laser power reaches a certain level, absorption is strongly saturated so that amplification increases now suddenly and the power rises very quickly until a major portion of the energy is again depleted from the laser medium and the power decreases again. The saturable absorber virtually functions as an automatically actuated switch. The pulse repetition rate of a Q-switched laser is determined by pump power, saturable absorption, effective number of laser ions involved, and other parameters. By taking an appropriate choice of the laser medium and by setting various laser parameters, the pulse parameters of Q-switched lasers, more particularly the pulse duration, pulse energy, and pulse repetition rate can be varied in very large ranges.

Particularly short pulse durations can be achieved with microchip lasers which are distinguished by very short resonators without air distances. These are distinguished by a sandwich construction which is comprised of an output coupler mirror and a saturable absorber mirror (SESAM) that define the resonator of the laser, with the laser medium (e.g. an Nd:YVO crystal) arranged between the laser mirror and the saturable absorber mirror. Such a setup can be produced at low cost and moreover it is very compact. A laser diode whose light is coupled into the resonator cavity described hereinabove by way of a simple optics serves as pump light source. Pulses generated in the resonator are separated from the pump light by means of a dichroic mirror.

As has been outlined hereinabove, the emission of the laser pulse with a passively Q-switched laser is initiated by spontaneous emission as soon as sufficient energy is stored in the laser medium. Since spontaneous emission is a statistical procedure, the time between sufficient energy storage in the laser medium and the initiation of the laser pulse varies. This oscillation is designated as a temporal jitter with passive Q-switched lasers. A jitter represents the mean oscillation of the reciprocal value of the pulse repetition rate of the laser. With passive Q-switched lasers, the jitter usually ranges by several orders of magnitude above the pulse duration. This problematic issue disadvantageously excludes passive Q-switched lasers from all applications in which it matters to obtain temporal synchronization with other processes.

Some approaches made to reduce the jitter of a passive Q-switched laser are known from prior art in technology.

On the one hand, a pulsed laser diode can be utilized as pump light source. Owing to the high pump rate, the rate of spontaneous emission increases. And as a result thereof, the probability for initiating the laser pulse rises, too. Thereby, the jitter can roughly be reduced by one order of magnitude, but it is still substantially greater than the pulse duration.

On the other hand, one can use an external pulsed laser which saturates the saturable absorber at least partly or which abruptly injects photons into the laser shortly before the passive Q-switched laser reaches the threshold of sufficient energy storage. Since saturating the absorber and/or feeding of photons into the resonator by means of the external laser occurs at a defined point of time, the laser pulse, too, is triggered at a defined point of time. In this manner, the jitter may become smaller than the pulse duration. However, the external laser itself must supply short pulses with a sufficient power which poses high demands on the external laser.

Against this background, it is the object of the present invention to provide a simple and compact passive Q-switched laser that emits laser pulses with a low temporal jitter.

The present invention solves this task based on a passive Q-switched laser of the species indicated hereinabove in such a manner that part of the light coupled out of the optical resonator is passed on to an optical delay line by means of a beam splitter and coupled back into the optical resonator after it has passed through the optical delay line.

As has been outlined hereinabove, photons generated by spontaneous emission initiate the laser pulse with conventional passive Q-switched lasers. This statistical process is inventively replaced with a determined process in order to minimize oscillations in the pulse repetition rate, i.e. the temporal jitter. For this purpose, part of the generated laser pulse is inventively passed through a delay line by means of a beam splitter after it has been coupled out of the resonator and then coupled back into the resonator. Accordingly, the temporal delay produced by the delay line should be somewhat smaller than the reciprocal value of the pulse repetition rate of the laser so as to be able to store sufficient energy for generating the next pulse by optical pumping in the laser medium. At the same time, the laser pulse must not have been triggered by spontaneous emission at the moment of arrival of the coupled-back light. The coupled-back laser pulse injects photons for initiating the successive light pulse and additionally it causes a (partly) saturation of the absorber which also contributes to initiating the next is light pulse. Both occur at a defined point of time which is determined by the optical delay line so that on the whole the temporal jitter can be reduced to the order of magnitude of the pulse duration itself.

In accordance with a preferred embodiment of the inventive laser, the delay line is of a reflective configuration. This results in a particularly simple and compact setup. The light pulse passed on to the delay line by means of the beam splitter passes twice through this line, namely in outward and return direction.

Preferably utilized as delay line with the inventive laser is a glass fiber into which part of the pulse energy is coupled and reflected back via a fiber Bragg grating at the end of the fiber in the laser resonator. The required fiber length l thus amounts to $l \leq c/2nf_{rep}$. Here, n is the refractive index of the fiber material and $f_{rep}$ is the pulse repetition rate of the laser. With a pulse repetition rate of 200 kHz, for example, the fiber length must amount to 500 meter, which is technically easy to realize. If the pulse repetition rate is increased by raising the pump power, then the laser with integral multiples of the pulse repetition rate $f_{rep}$ will also pass over into a jitter-reduced operation, because in that case photons for initiating the next laser pulse are then always also provided at the proper point of time. In this manner, the laser with a 500 meter long delay line can generate pulse repetition rates of 200, 400, . . . , 1000 kHz with a reduced jitter. In principle, the delay line can also be realized by a conventional multipass cell of mirrors.

An advantageous further improvement consists in providing two or more fiber Bragg gratings along the longitudinal extension of the light-conducting fiber. Differently long delay lines are thus formed. By appropriately adjusting the pump power of the pump light source, it is possible to set the pulse repetition rate of the laser such that the afore-mentioned condition $l \leq c/2nf_{rep}$ is fulfilled, which means that the reciprocal value of the pulse repetition rate of the free-range laser is somewhat greater than the rate predetermined by the delay line. When part of the light coupled out of the optical resonator is coupled into the optical delay line by means of the beam splitter, the laser then adjusts itself to that pulse repetition rate of the delay line which the afore-mentioned condition is fulfilled for at best. In this manner, several different pulse repetition rates can be realized with a prefabricated delay line in which the temporal jitter is reduced as has been outlined hereinabove.

Furthermore advantageous is a configuration of the inventive laser in which the delay line is adjustable. Thereby the pulse repetition rate of the laser can be continuously tuned.

An expedient further development of the inventive laser consists in that the part of the light passed on to the delay line by means of the beam splitter passes through a frequency converter before it is coupled back into the optical resonator. According to this configuration, part of the light coupled back to initiate each successive laser pulse has a different wavelength than the light of the generated light pulse and can be utilized for other applications.

In accordance with a preferred embodiment of the present invention, an optical amplifier is arranged downstream of the optical resonator. For example, this may be a fiber amplifier of an actually known species. By way of the amplifier arranged downstream, the power of the laser can be adapted in accordance with the application.

The inventive laser is suitable for applications in distance measurement (LIDAR). Likewise, the laser is well suitable for high-precision material processing. Further fields of application are in the range of non-linear frequency conversion and time-resolved spectroscopy.

Figure 3:
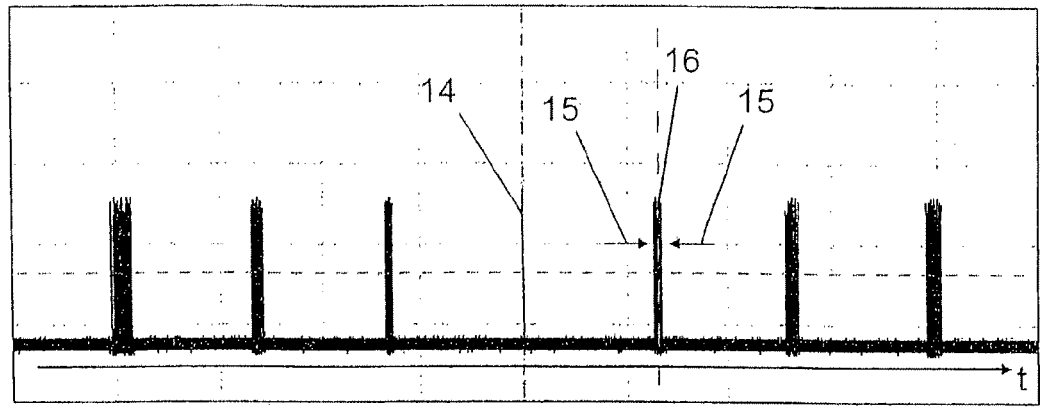
Figure 4:
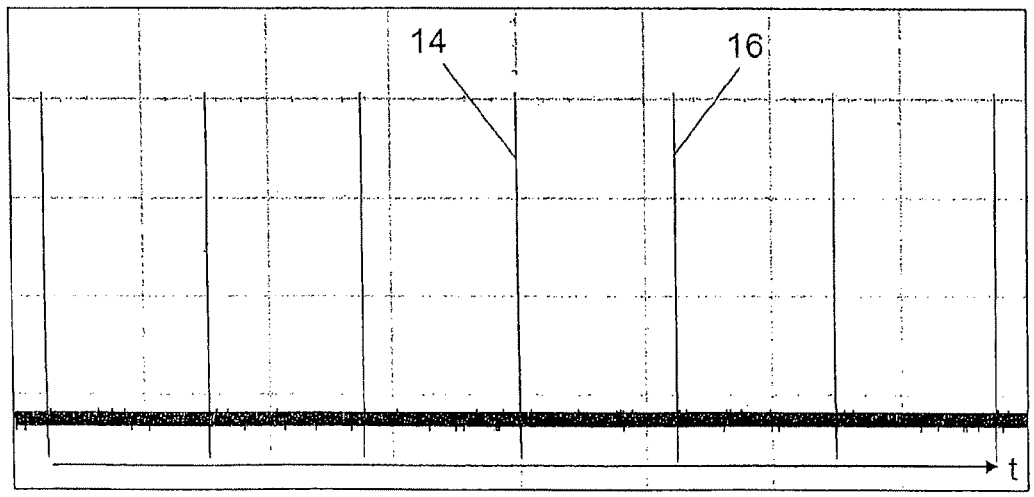
Figure 5:
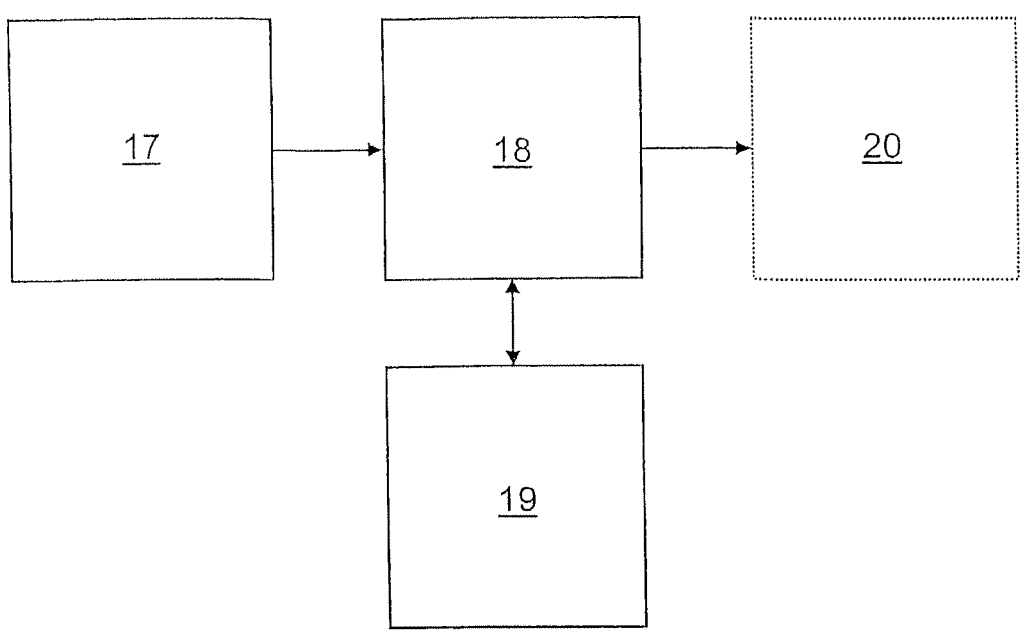

A practical example of the invention is more closely elucidated in the following by way of various figures, in which:

FIG. 1: shows a schematic representation of the setup of the inventive laser;

FIG. 2: shows the temporal curve of power, stored energy, and losses in the inventive laser;

FIG. 3: shows the temporal jitter of the pulse repetition rate of a passive Q-switched laser without the inventive feedback;

FIG. 4: shows the inventive reduction of the temporal jitter with feedback;

FIG. 5: shows the inventive laser as a block-type diagram.

FIG. 1 schematically shows the setup of the inventive laser. The light from a pump light source 1 which for example is a laser diode is passed via a simple optics comprised of two convergent lenses 2, 3 to an optical resonator which is comprised of an output coupler mirror 4 and a saturable absorber mirror 5. Arranged between the output coupler mirror 4 and the saturable absorber mirror 5 is a laser medium 6 which is optically pumped by means of the pump light source 1. The laser medium 6 is pumped by means of the pump light source 1 for as long as required until the inversion, i.e. until the stored energy in the laser medium 6 renders a sufficient optical amplification in order to compensate for the losses of the saturable absorber mirror 5 and the losses resulting from the light coupled out of the resonator. Then the laser reaches its threshold. The laser light developing in the resonator 4, 5, 6 bleaches the saturable absorber 5, the quality of the resonator rises, and a laser pulse is generated. The laser pulse is coupled out of the resonator and separated via dichroic mirror 7 from the pump light. The process starts again. Part of the laser pulse coupled out is coupled back by the aid of a beam splitter 8 via a reflecting delay line 9 into the laser. The delay time is somewhat smaller than the reciprocal value of the pulse repetition rate of the passively Q-switched laser. With the practical example illustrated here, the delay line 9 is comprised of a light-conducting fiber which at its end sides is comprised of a fiber Bragg grating.

FIG. 2 shows the temporal curve of the power 10, energy stored in the medium, i.e. inversion 11 and losses 12 in the laser illustrated in FIG. 1. The arrow 13 drawn-in on the time axis marks the point of time of the arrival of the laser pulse coupled back with some time delay by means of the time delay line 9. At the point of time 13, sufficient inversion 11 to generate the next pulse has already been stored by optical pumping of the laser medium 6. But the laser pulse has not yet been triggered by spontaneous emission. The coupled-back laser pulse injects photons for initiating the successive laser pulse 10 by stimulated emission. In addition, the coupled-back laser pulse at the point of time 13 causes a (partly) sudden saturation of the saturable absorber 5 which also contributes to initiating the successive laser pulse 10. As can be seen in the diagram in FIG. 2, the inversion 11 decreases down to a minimum during the generation of the laser pulse 10. Upon generation of the laser pulse 10, the losses 12 in the laser resonator rise again. Afterwards, the process starts all over again. By way of the inventive feedback, the temporal jitter of the pulse repetition is reduced to the order of magnitude of the pulse duration itself.

FIG. 3 illustrates the temporal jitter of the pulse repetition rate of the passive Q-switched laser shown in FIG. 1 without the inventive feedback based on an oscillogram. The laser pulse 14 indicated in the middle of the diagram serves as reference pulse. The arrows 15 elucidate the temporal oscillation, i.e. the jitter when generating the successive laser pulse 16.

The oscillogram shown in FIG. 4 accordingly illustrates the reduction of the temporal jitter with the inventive passive Q-switched laser with feedback. In the oscillogram shown in FIG. 4, the temporal jitter is no longer visible. The jitter is reduced to the order of magnitude of the pulse duration itself.

According to the block-type diagram in FIG. 5, the inventive laser is comprised of an optical pump (with the pertinent optics) 17. It pumps as passive Q-switched laser 18 in an actually known manner. It has as repetition rate $f_{rep}$. Part of the light coupled out from the resonator of the laser 18 is passed on to an optical delay line 19 and coupled back after it has passed through the delay line 19. The temporal delay generated by the delay line 19 amounts to $\Delta t \leq n/f_{rep}$. Here, n is a natural number. The term "≲" stands for somewhat smaller in the sense outlined hereinabove. At the point of time of the arrival of the coupled-back laser pulse, sufficient energy for generating the next pulse must have been stored in the laser medium of laser 18 by optical pumping by means of pump 17. Simultaneously, at the point of time of the arrival of the light coupled back, a new laser pulse must not have been triggered by spontaneous emission. In result, the illustrated system emits a jitter-reduced pulse train 20.

The invention claimed is:

1. A Q-switched laser comprised of a pump light source (1), an optical resonator accommodating a laser medium (6), and a passive Q-switch (5), wherein part of the light coupled out of the optical resonator is passed on by means of a beam splitter (8) to an optical delay line (9) and coupled back into the optical resonator after having passed through the optical delay line (9); wherein the delay line (9) is so configured that:
   the temporal delay by which the light is coupled back into the resonator is somewhat smaller than the reciprocal value of the pulse repetition rate or somewhat smaller than the integral multiple of the reciprocal value of the pulse repetition rate of the Q-switched laser; and
   a new laser pulse has not been triggered by spontaneous emission at the point of time of the arrival of the light coupled back into the resonator.

2. The Q-switched laser according to claim 1, wherein the delay line (9) is reflective.

3. The Q-switched laser according to claim 1, wherein the beam splitter (8) is a polarization beam splitter, a dielectric splitter, or a fiber optical beam splitter.

4. The Q-switched laser according to claim 3, wherein the delay line (9) is comprised of a light-conducting fiber, wherein the light-conducting fiber at its end side has a reflecting fiber Bragg grating.

5. The Q-switched laser according to claim 4, wherein the light-conducting fiber along its longitudinal extension has two or more fiber Bragg gratings.

6. The Q-switched laser according to claim 1, wherein the delay line (9) is comprised of a multipass cell with two or more mirrors.

7. The Q-switched laser according to claim 1, wherein the pump power of the pump light source (1) is adjustable.

8. The Q-switched laser according to claim 1, wherein the delay line (9) is adjustable.

9. The Q-switched laser according to claim 1, wherein the part of the light passed on by means of the beam splitter (8) to the delay line (9) passes through a frequency converter before coupled back into the optical resonator.

10. The Q-switched laser according to claim 1, wherein the Q-switch (5) is a saturable absorber.

11. The Q-switched laser according to claim 1, further comprising an optical amplifier arranged downstream of the resonator.

12. Application of the Q-switched laser according to claim 1 in distance measurement, material processing, non-linear frequency conversion or time-resolved spectroscopy.

* * * * *